United States Patent [19]

Jacobson

[11] 4,344,183

[45] Aug. 10, 1982

[54] MEASURING TOOL FOR COMPUTER ASSISTED TOMOGRAPHIC SCANNER

[75] Inventor: Donald R. Jacobson, Madison, Wis.

[73] Assignee: Radiation Measurements, Inc., Middleton, Wis.

[21] Appl. No.: 140,152

[22] Filed: Apr. 14, 1980

[51] Int. Cl.³ .............................................. G01D 18/00

[52] U.S. Cl. ...................................... 378/207; 378/19; 378/163

[58] Field of Search .................. 250/476, 445 T, 491, 250/252, 320

[56] References Cited

U.S. PATENT DOCUMENTS 3,509,337 4/1970 De Clerk et al. .................. 250/476

3,887,804 6/1975 Morgan et al. ..................... 250/476

4,055,771 10/1977 Goodenough ................. 250/445 T

OTHER PUBLICATIONS

"Wisconsin Tomographic Test Tool", trade brochure, Radiation Measurements, Inc., 7617 Donna Drive, P.O. Box 44, Middleton, WI 53562, 1977.

*Primary Examiner*—Alfred E. Smith
*Assistant Examiner*—Carolyn E. Fields
*Attorney, Agent, or Firm*—Isaksen, Lathrop, Esch, Hart & Clark

[57] ABSTRACT

A measuring tool (10) for determining the thickness and position of the X-ray beam of a computer is disclosed which allows the information about the X-ray beam to be derived by analysis of a tomographic image taken of the measuring tool. The measuring tool (10) includes a phantom (12) which has formed therein a plurality of receptacles (14) which receive inserts (16). At least two of the inserts (16) each include therein an image creating pattern (20) including a helical pattern (22) and a center indicator (24) so that both thickness and positioning information can be obtained from the computer-generated tomographic image taken of the tool by examining the images created of the helical patterns (22) and center indicators (24) in the inserts (16).

10 Claims, 8 Drawing Figures

MEASURING TOOL FOR COMPUTER ASSISTED TOMOGRAPHIC SCANNER

TECHNICAL FIELD

The present invention relates, in general, to tools for use with tomographic apparatus and, in particular, to a measuring tool which may be used to determine the thickness and positioning of the X-ray beam in a computer assisted tomographic scanner.

BACKGROUND OF THE PRIOR ART

The prior art is generally cognizant of the use of tools which may be scanned or measured by instruments in order to establish a standard against which future measurements may be measured. As an example, U.S. Pat. No. 4,014,109 discloses a phantom of a human figure which includes therein material which may be imaged externally so as to test the sensitivity of the measuring device. Other patents which show the use of such passive calibrating device for calibration or testing of a wide variety of radiation instruments and devices are U.S. Pat. No. 2,280,905, U.S. Pat. No. 3,778,837, U.S. Pat. No. 3,791,192, U.S. Pat. No. 3,933,026, U.S. Pat. No. 3,986,384, U.S. Pat. No. 4,028,545, U.S. Pat. No. 4,033,880, U.S. Pat. No. 4,154,672.

The assignee of the present patent application has also previously manufactured a test tool for use in non-computerized radiographic tomography, also called ordinary tomography, which includes a cylindrical section of plastic material having embedded therein twelve lead alloy numbers arranged in a helical pattern. By imaging that tool with a radiographic tomographic apparatus, it was possible to determine the location of the plane and the general thickness of cut of such a tomographic unit by examination of the resulting image. This tool is used exclusively with non-computer aided tomographic devices.

BRIEF SUMMARY OF THE INVENTION

The present invention is summarized in that a measuring tool for determining the thickness and positioning of the X-ray beam of a computer assisted tomographic scanner includes a phantom constructed of a material having a low attenuation to X-rays and having at least two receptacles formed therein; a reference line on the exterior of the phantom to define a reference plane therethrough; at least two inserts also formed of a material having a low attenuation to X-rays and each shaped so as to fit into a one of the receptacles in the phantom; and an image creating pattern formed of a material having high attenuation to X-rays embedded in each of the inserts, each of the image creating patterns including a center indicator positioned in the reference plane and a helical pattern of a pre-selected pitch so that the thickness and position of the X-ray beam may be measured from a tomographic image taken of the tool.

It is an object of the present invention to provide a passive tool which may be scanned by a computer assisted tomographic scanning apparatus to create an image from which X-ray beam positioning and thickness information about the apparatus may be easily derived.

It is an object of the present invention to provide such a measuring tool which is particularly adapted for use with computer assisted aided tomographic scanners which rotate about an axis extending through the body being scanned.

It is a further object of the present invention to construct such a tool in which a maximum number of measurements can be conducted simultaneously with a single operation of the computer assisted tomographic apparatus.

Other objects, advantages and features of the present invention will become apparent from the following specification when taken in conjunction with the accompanying drawings.

DETAILED DESCRIPTION OF THE PREFERRED EMBODIMENT

Figure 1:
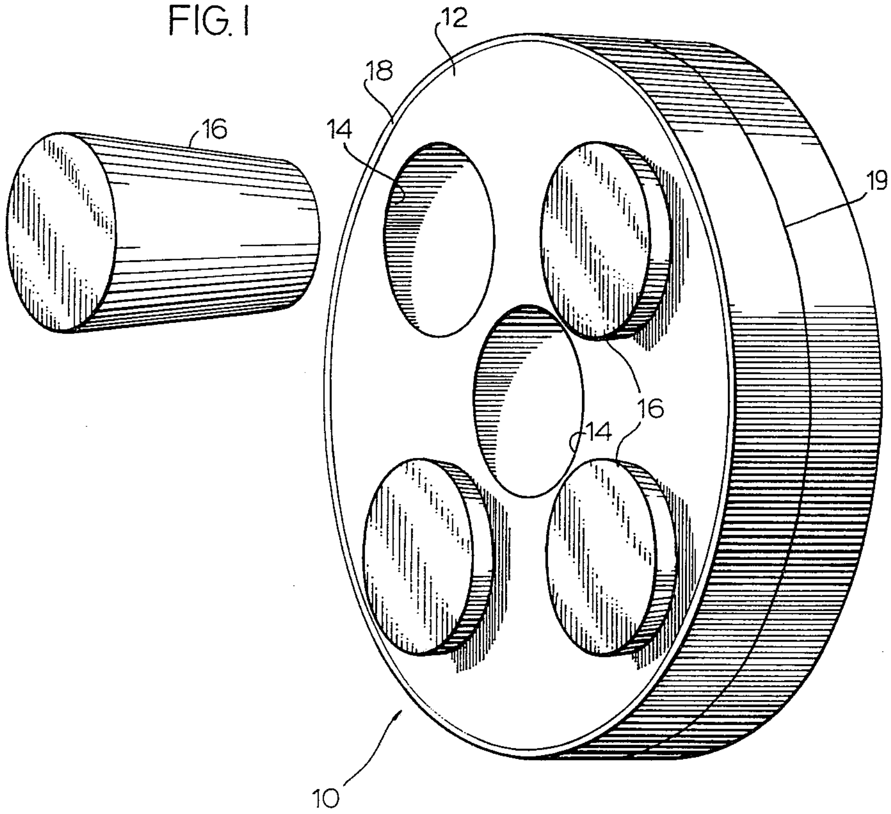
FIG. 1 is a perspective view of a measuring tool for determining the thickness and position of the X-ray beam of a computer assisted tomographic scanner constructed in accordance with the present invention.

Shown in FIG. 1, and generally indicated at 10, is a beam thickness and position measuring tool for use with a computer assisted tomographic scanner, constructed in accordance with the present invention. The measuring tool 10 includes generally a phantom 12 which has formed therein a plurality of receptacles 14 each of which is adapted to receive in there a one of a plurality of inserts 16. The phantom 12, as illustrated in FIG. 1, includes five of the receptacles 16 and it is envisioned that any number, up to five, of the inserts 16 may be used in a particular application with different kinds of the inserts 16 being used for appropriate measurements. Each of the inserts 16 and the bulk of the phantom 12 are formed of an epoxy-formulated thermoplastic material formulated so as to have a uniform low attenuation of X-rays so as to create a tomographic image similar to that created by water. The phantom 12 is a disc-shaped, being circular in cross-section and having a preselected depth. The phantom 12 is provided about its periphery with a reference band 18 which is formulated of a high density material having a high attenuation of X-rays so as to create a tomographic image similar to the tomographic image created by bone. A reference line 19 is drawn on the exterior periphery of the phantom 12 to define a reference plane extending through the phantom 12. Each of the receptacles 14 is frusto-conical in shape and is wider at the front of the phantom 12 than at the back thereof. Each of the receptacles 14 is positioned so that the central, longitudinal axis of its conical section is perpendicular to the circular cross-sectional plane of the phantom 12.

Figure 2:
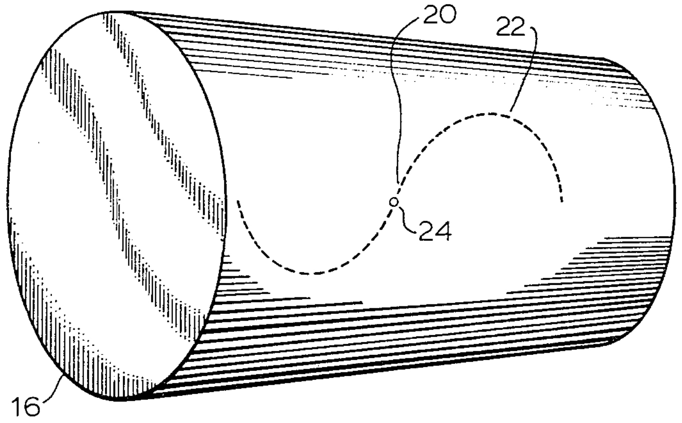
FIG. 2 is a perspective view of a one of the inserts for the tool of FIG. 1.

Shown in FIG. 2 is perspective side view of a one of the inserts 16. The insert 16 is also frusto-conical in shape and is sized so as to correspond generally to the size of the receptacles 14 formed in the phantom 12. However, the insert 16 is designed to be taller, i.e., longer along its central axis, than the depth of the phantom 12 so that the insert 16 extends beyond both the front and the rear ends of the receptacle 14 in the phantom 12 into which it is inserted. Embedded inside of the insert 16 is an image creating pattern 20. The elements of the image creating pattern 20 are all formed of material having a high attenuation to X-rays, such as aluminum or other metal. The image creating pattern 20 is formed of two components, a helical pattern 22 and a center indicator 24. The helical pattern 22 is formed by a continuous solid section of wire wound into a helical configuration having a preselected pitch. Preferably, the helical wire is shaped so as to have a pitch that is both regular and has a pre-selected integer value of longitudinal displacement for a particular amount of radial displacement. Thus, for example, the helical wire may be configured so as to have a pitch such that a movement of one centimeter along the longtitudinal axis of the insert 10 corresponds to a rotation of 180° of the helical pattern 22. Obviously, any desired pitch of the wire of the helical pattern 22 could be selected as may be desired for a particular one of the inserts 16, with the insert 16 being sized and shaped so that the center indicator 24 is positioned in the reference plane defined by the reference line 19. The center indicator 24 is a metal ball positioned adjacent to the helical pattern 22 at the center of the insert 16. The entire image creating pattern 20, including the helical pattern 22 and the center indicator 24, is positioned within the insert 16 so as to be positioned at a particular preselected position within the measuring tool 10, i.e., with the center indicator 24 located in the reference plane, when the insert 16 is inserted into a one of the receptacles 14 in the phantom 12. Each of the inserts 16 utilized with a single phantom 12 preferably have their image creating patterns 20 identically positioned within the inserts 16 so that the patterns created by all the inserts 16 may be used in conjunction to derive the appropriate beam orientation information as will be described below.

In its operation, one or more of the inserts 16, each including therein an image creating pattern 20, is inserted into a respective receptacle 14 in the phantom 12. Then the measuring tool 10 is placed within the computer assisted tomographic scanner, also variously called a CT scanner or a CAT scanner, with the measuring tool 10 being aligned by the light beam or other indicator of slice positioned created by the scanner. The scanner is then operated upon the measuring tool 10 as if the measuring tool 10 was a portion of a patient of which it was desired to take a scan. The tomographic image created by the computer of the scanner is the analyzed to derive beam thickness and position information therefrom.

Figure 3:
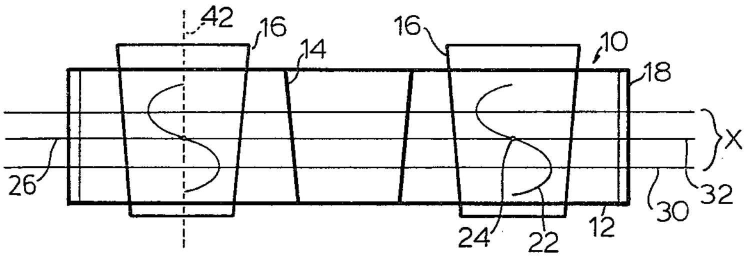
FIG. 3 is a schematic cross-sectional view of the tomographic tool of FIG. 1 being scanned by the X-ray beam of the tomographic apparatus.

Thus, for example, referring to FIG. 3 assume that a beam of X-rays 30, having a width indicated at x, is directed through the measuring tool 10 in perfect alignment therewith. If the X-ray beam 30 is in such perfect alignment, a centerline 32 of the X-ray beam 30 will extend laterally through the center of the measuring tool 10 exactly perpendicularly to the central axis of each of the inserts 16 and precisely coplanar with the reference plane, here indicated at 26, defined by the reference line 19 in the phantom 12. The central axis 42 of a one of the inserts 16 is illustrated in FIG. 3. With the centerline 32 of the X-ray beam 30 being directed through the exact center of the tool 10 and being perpendicular to the central axis 42 of the inserts 16, the centerline 32 of the X-ray beam 30 is centered exactly on the center indicators 24 contained in each of the insert 16 inserted into the phantom 12. This can be seen in FIG. 3, wherein the beam of X-rays 30 has its centerline 32 pass precisely along the reference plane 26 and through the two center indicators 24 contained in the two inserts 16 inserted into the phantom 12 shown in that figure. It is also illustrated, for the purposes of FIG. 3, that the width X of the beam is precisely equal to the amount of longitudinal displacement which each of the helical patterns 22 of the inserts 16 achieves as they are rotated through 180° of arc.

Figure 4:
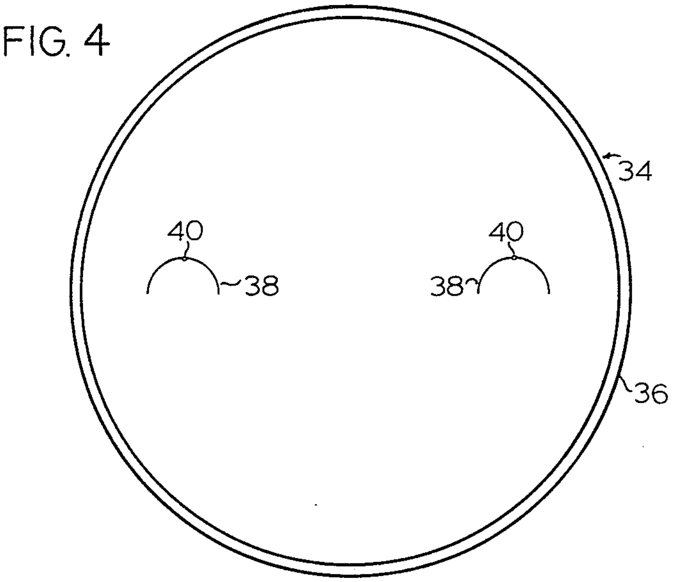
FIG. 4 is an illustration of the resulting computer generated tomographic image generated from the scan illustrated in FIG. 3.

Shown in FIG. 4, is an image 34 generated by the computer assisted tomographic scanner resulting from the scan utilizing the beam illustrated in FIG. 3. As can be seen in FIG. 4, the reference band 18 creates a circular figure 36 in the tomographic image 34 which may be used as a reference circle for measurements of angular misalignment of the phantom 12. As can also be seen in FIG. 4, the scanning of the two helical patterns 22 in the insert 16 which were inserted into the tool 10 results in the formation of two arcuate images 38 in the tomographic image 34. Each of the arcuate images 38, as shown in FIG. 4, is precisely 180° in arc. Also formed in the tomographic image 34 is a pair of center reference images 40. Each of the center reference images 40 is, in this instance, precisely located in the center of the respective arcuate image 38 associated therewith. From the tomographic image 34 it is possible to measure the beam thickness X of the beam 30 used to scan the tool 10 by measuring the length of arc of each of the arcuate images 34 formed in the tomographic image 34. Thus, if the helical patterns 22 of the insert 16 used in FIG. 3 were formed so as to have one centimeter of longitudinal displacement for each 180° of rotation, the fact that the arcuate images 38 in the resultant tomographic image 34 have 180° of arc would indicate that the beam thickness X was precisely one centimeter. Obviously, an arcuate image 34 showing an arc of more than, or less than, 180° would indicate that the beam thickness was proportionately either more than, or less than, one centimeter at that precise position. Also, by observing that the center reference images 40 were precisely centrally located within each of the arcuate images 38, it is possible to determine that the centerline 32 of the beam 30 was precisely centrally positioned with respect to each of the image creating patterns 20 in the inserts 16 and that therefore the tool 10 was precisely correctly positioned within and aligned with the scan position indicator of the tomographic scanner being tested.

Figure 5:
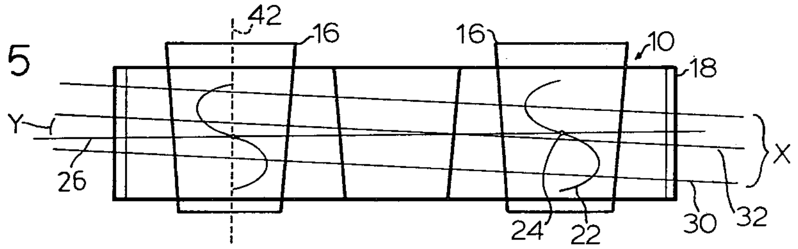
FIG. 5 is a schematic diagram, similar to FIG. 3, of another scan of the tomographic test tool of FIG. 1.
Figure 6:
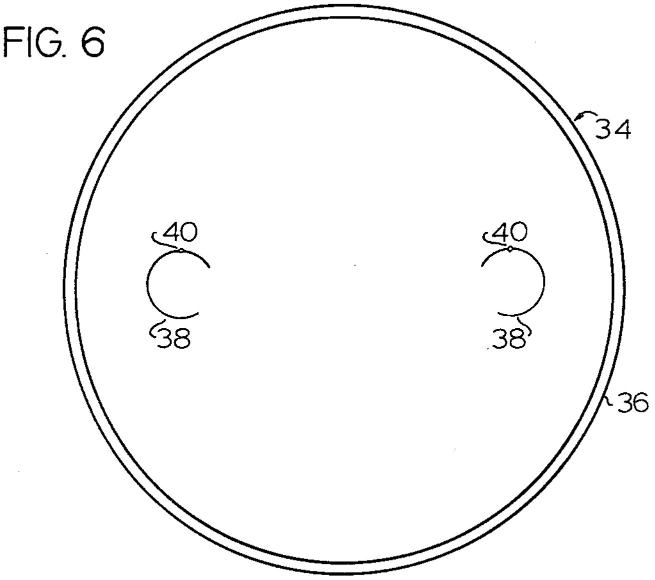
FIG. 6 is an illustration of the resulting computer generated tomographic image generated from the scan illustrated in FIG. 5.

Shown in FIGS. 5 and 6 is another example of a test scan and resulting image created by the measuring tool 10 of the present invention. As can be seen in FIG. 5, in this embodiment the tomographic scanning Xray beam 30, which is again indicated to have a width X, is also tilted with respect to the reference plane 26 by an angle Y. The beam 30, as shown in FIG. 5, also has a width X which is somewhat greater than the longitudinal distance which the helical patterns 22 achieves in 180° of rotational arc. Also the centerline 32 of the X-ray beam 30 does not pass through either of the center indicators 24 in the inserts 16. Shown in FIG. 6 is the resultant image 34 created by the scanning of the tool 10 as illustrated in FIG. 5. In the tomographic image 34 of FIG.

6, each of the arcuate images 38 includes more than 180° of arc and, in fact, includes approximately 270° of rotational arc. From the fact that the arcuate images 38 are about 270° in the tomographic image 34 of FIG. 6, it is possible to ascertain that the beam width, or thickness, X of the beam 30 as shown in FIG. 5 is approximately 50% greater than the longitudinal distance which the helical patterns 22 achieves in 180° of arc. Thus, if the helical patterns 22 of the inserts 16 have a pitch selected so as to give a longitudinal translation of one centimeter for each 180° of rotational arc, the tomographic image 34 of FIG. 6 would indicate, by examining the length of the arcuate images 38 therein, that the beam 30 of FIG. 5 has a width of approximately one and one half centimeters. Also, as can be seen in FIG. 6, each of the center reference images 40 is located near one extreme end of the respective arcuate image 38. Furthermore, since each of the center reference images 38 is offset in an opposite direction from the other relative to its appropriate arcuate image 38, it can be ascertained that the centerline 32 of the beam 30 shown in FIG. 5 passed on one side of a one of the center indicators 24 of the inserts 16 and on the other side of the other center indicator 24 as it passed through the measuring tool 10. By comparing the relative angular distances by which the center reference images 38 are displaced from the center of the arcuate images 38, it is possible to calculate the distance by which the centerline 32 of the X-ray beam 30 missed the center indicator 24 of each of the inserts 16 so that the orientation and magnitude of the angle Y at which the tool was skewed from precisely perpendicular to the longitudinal axis of the measuring tool 10, as positioned with the positioning device of the tool, can be determined. In this way, the position of the measuring tool 10 relative to the plane of rotation of the X-ray beam 30 can be ascertained with a high degree of accuracy and the accuracy of the slice position indicator of the scanner can be checked.

Thus, by using the beam thickness and position measuring tool of the present invention it is possible both to determine the beam thickness and orientation of the computer-assisted tomographic beam relative to the object being scanned. Thus, by inserting the measuring tool 10 in the position in the computer tomographic scanner normally occupied by the patient, as indicated by the slice position indicator of the scanner, it is possible to ascertain not only the width of the X-ray beam which is utilized to scan the patient, it is also possible to ascertain whether or not the beam is properly oriented relative to the patient so that the desired images can be obtained. All of this information can be obtained through one simple scan of a measuring tool 10 with resultant computer generated tomographic image 34 carrying both beam thickness and position information. This information is permanently retained on the resultant tomographic image 34 and thus can be retained for furture use or reference, as well as for use in immediate adjustments of the computerized tomographic scanner.

Figure 7:
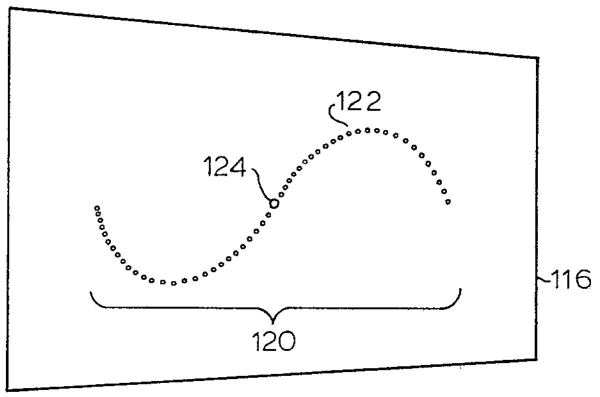
FIG. 7 is a side view of an alternative embodiment an insert for use within the measuring tool of FIG. 1.

Shown in FIG. 7 is an alternative embodiment, 116, of an insert for use in the measuring tool 10. The insert 116 has formed therein an image creating pattern 120 which includes a helical pattern 122 formed of a series of discrete metal balls which are arranged in a helical array. Again, the helix of the helical pattern 122 is selected so as to have a predetermined pitch so that each particular segment of rotational displacement would be proportional to a given amount of longitudinal displacement. In the center of the image creating pattern 120, a larger center indicator ball 124 is used for one of the other metal balls in the helical pattern 122. The larger center indicator ball 124 is utilized as a center indicator similar to the center indicator 24 contained in the insert 16. It is also possible to use a pair of balls located together as the center indicator.

The alternative embodiment of the insert 116 for use in the measuring tool 10 can be substituted for the insert 16 of the FIGS. 1 and 2 in any application in which it is so desired. The insert 116 may be utilized when it is desired that the information obtained from the resultant tomographic image 30 be discrete or digitized since the number of markers in the arcuate could then be simply counted without the need for measurement of an arcuate image. However, the resolution of the test would then be limited by the number and spacing of the metal balls in the helical pattern 122, a limitation not found in the continuous helical pattern 22 in the inserts 16.

Figure 8:
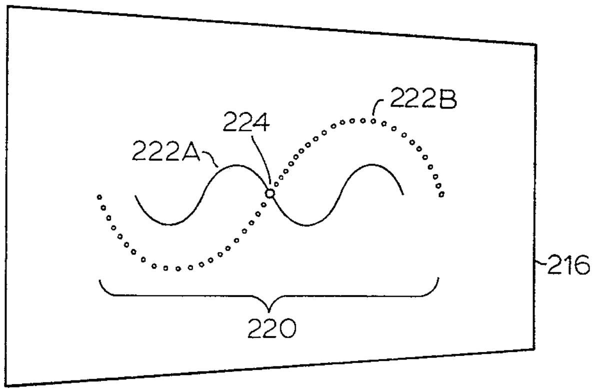
FIG. 8 is yet another alternative embodiment of an insert for use in the measuring tool of FIG. 1.

Shown in FIG. 8 again another alternative embodiment of an insert 216 for use in a measuring tool 10 constructed in accordance with the present invention. In the insert 216, the image creating pattern 220 formed therein includes two helical patterns 222A and 222B. The helical patterns 222A is selected to have a greater pitch than the helical pattern 222B and the helical pattern 222B is selected so as to have a large radius in its helix so that the helical patterns 222A can be nested centrally entirely within the the helical pattern 222B as can be seen in FIG. 8. Both of the helical patterns *222a* and *222b* share a common center indicator 224. This embodiment is intended to be utilized where it is desired to obtain information over a wider range about the thickness of the X-ray beam. For example, for very thin X-ray beams, or if the beam is more than a certain thickness, i.e. twice the pitch of the helix, the resultant arcuate image could be circular image, thus giving indefinite information about the exact width of the beam. To attempt to avoid such a situation, the use of two of the helical patterns 222A and 222B helps to ensure that one of the two helical patterns would result in a creation of an image that is less than circular and could be successfully measured to determine the width of the beam being tested. Thus the insert 216 would be more appropriately desired in applications in which the width of the beam is known to vary over a greater area or in which the width of the beam is unknown.

While it is envisioned that the image creating patterns utilized in the present invention are most advantageously utilized in the inserts designed to be inserted into a phantom, it is also envisioned that they may be used in unitary molded structures which may be inserted alone into a computer assisted tomographic scanning apparatus. Such image creating patterns are, however, most efficiently utilized at least in pairs so that the information as to the relative beam positioning between two such patterns can be compared in the resultant tomographic image. It is, however, envisioned that such image creating patterns can be utilized alone in applications wherein only beam thickness information is desired.

It is also envisioned that helical patterns of any desired shape or pitch could be utilized with the present invention. It may also be desirable to include inserts having both a left-hand or a right-hand helix in any one tool or in different tools. It is clear that a wide variety of helical or spiral configurations, whether regular or not, are possible.

It is understood that the present invention is not limited to the particular construction and arrangement of parts disclosed and illustrated herein, but embraces all such modified forms thereof as come within the scope of the following claims.

I claim:

1. A measuring tool for determining the thickness and positioning of the X-ray beam of a computer assisted tomographic scanner comprising:

a phantom (12) constructed of a material having low attenuation to X-rays and having at least two receptacles (14) formed therein;

reference line means (19) on the exterior of the phantom (12) for defining a reference plane extending therethrough;

at least two inserts (16) also formed of a material having low attenuation to X-rays and each shaped so as to fit into a one of the receptacles (14) in the phantom (12);

an image creating means for measuring the thickness and position of the X-ray beam including at least one image creating pattern (20) formed of a material having high attenuation to X-rays embedded in one of the inserts (16), the image creating pattern (20) including a center indicator (24) positioned in the reference plane and a helical pattern (22) of a preselected pitch so that the thickness and position of the X-ray beam can be measured from a tomographic image taken of the tool; and tilt detection means for detecting any tilt of the reference plane relative to the plane of the X-ray beam, including at least one other image creating pattern (20) in an insert (16), the image creating pattern (20) including a center indicator (24) and a helical pattern (22) so that any tilt in the beam can be detected by comparing the images of the two image creating patterns (20) in a tomographic image of the tool.

2. A measuring tool as claims in claim 1 wherein each of the helical patterns (22) is a continuous wire formed into a helical pattern.

3. A measuring tool as claimed in claim 1 wherein each of the helical patterns (122) is a series of discrete balls positioned in a helical pattern.

4. A measuring tool as claimed in claim 1 wherein each of the image creating patterns (220) includes two helical patterns (222A, 222B) of different pre-selected pitch so that beam thickness information can be derived over a broad range of values.

5. A measuring tool as claimed in claim 1 wherein the phantom (12) and the inserts (16) are formed of a thermoplastic material.

6. A measuring tool as claim in claim 1 wherein the phantom (12) has formed about its periphery a reference band (18) formed of material having a high attenuation to X-rays.

7. A measuring tool as claimed in claim 1 wherein the image creating pattern (20) is formed of metal.

8. A measuring tool as claimed in claim 1 wherein the inserts (16) are frusto-conically shaped and the receptacles (14) in the phantom (12) are correspondingly frusto-conically shaped.

9. A measuring tool as claimed in claim 1 wherein the center indicator (24) is a ball adjacent to the helical pattern (22).

10. A measuring tool for determining the thickness and positioning of the X-ray beam of a computer assisted tomographic scanner comprising:

a phantom (12) constructed of a material having low attenuation to X-rays;

reference line means (19) on the exterior of the phantom (12) for defining a reference plane extending therethrough;

at least two inserts (16) in the phantom (12); and image creating means for measuring the thickness and position of the X-ray beam including at least one image creating pattern (20) formed of a material having high attenuation to X-rays embedded in one of the inserts (16), the image creating pattern (20) including a center indicator (24) positioned on the reference plane and a helical pattern (22) of a preselected pitch so that the thickness and position of the X-ray beam can be measured from a tomographic image taken of the tool; and tilt detection means for detecting any tilt of the reference plane relative to the X-ray beam including at least one other image creating pattern (20), the two image creating patterns (20) being separated by a sufficient distance so that tilts of the X-ray beam relative to the reference plane can be detected by comparing the images of the two image creating patterns.

* * * * *